United States Patent [19]

Mizuno et al.

[11] Patent Number: 4,784,895

[45] Date of Patent: Nov. 15, 1988

[54] MAGNETIC RECORDING MEDIUM AND PROCESS FOR THE PREPARATION OF THE SAME

[75] Inventors: Chiaki Mizuno; Hiroshi Ogawa; Shinji Saito; Minoru Kanazawa; Naoyoshi Chino, all of Kanagawa, Japan

[73] Assignee: Fuji Photo Film Co., Ltd., Kanagawa, Japan

[21] Appl. No.: 172,812

[22] Filed: Mar. 25, 1988

[30] Foreign Application Priority Data

Mar. 28, 1987 [JP] Japan ................. 62-74886

[51] Int. Cl.$^4$ .................................. G11B 5/70
[52] U.S. Cl. ........................... 428/212; 427/130; 427/131; 428/323; 428/694; 428/900; 428/336
[58] Field of Search ............ 428/212, 323, 694, 900, 428/420; 427/131, 130

[56] References Cited

U.S. PATENT DOCUMENTS 4,518,626  5/1985  Kato et al. .................... 427/130
4,578,280  3/1986  Greiner et al. ................ 427/130
4,624,883  11/1986  Yamaguchi .................... 427/131
4,741,953  5/1988  Katsuta et al. ................ 427/131

Primary Examiner—Paul J. Thibodeau
Attorney, Agent, or Firm—Sughrue, Mion, Zinn, Macpeak and Seas

[57] ABSTRACT

A magnetic recording medium comprising a nonmagnetic support, a first magnetic recording layer and a second magnetic recording layer, superposed in order, wherein:

a coercive force of the second magnetic recording layer is in the range of 400 to 2,000 Oe, a ratio of said coercive force to a coercive force of the first magnetic recording layer being in the range of 1.0 to 2.5;

a mean longitudinal length of a magnetic powder contained in the second magnetic recording layer is not longer than 0.35 μm, a ratio of said mean longitudinal length to a mean longitudinal length of a magnetic powder contained in the first magnetic recording layer being in the range of 0.4 to 1.0; and a mixed area of compositions of the first magnetic recording layer and the second magnetic recording layer which has a thickness of 0.1 to 1.1 μm is provided between the first and second magnetic recording layers.

11 Claims, 2 Drawing Sheets

MAGNETIC RECORDING MEDIUM AND PROCESS FOR THE PREPARATION OF THE SAME

BACKGROUND OF THE INVENTION

1. Field of the Invention

The present invention relates to a magentic recording medium and a process for the preparation of the same. More particularly, the invention relates to a magnetic recording medium having a magnetic recording layer consisting of at least two layers which is improved in frequency characteristics and a process for the preparation of the same.

2. Description of Prior Art

Magnetic recording media such as an audio tape and a video tape are desired to be excellent in various properties in recent years. For example, an audio cassette tape is required to show low noise, well-balanced frequency characteristics and high output in all frequency bands. Such requirement for the audio cassette tape tends to increase more and more because various developments such as a development of digital system have been recently made in pursuit of ultra hi-fi audio sources or extremely low noise audio sources as shown in a compact disc. A video tape is also required to show higher video output and lower noise.

In order to accomplish the above-mentioned excellent properties of the magnetic recording medium, various methods have been proposed. For example, a method of using iron oxide magnetic particles having a short length in the mean longitudinal length as a magnetic powder of the recording medium is known is lower a noise level. This method is able to lower a noise level of the resulting medium, but unable to give satisfactory frequency characteristics to the medium.

For improving the frequency characteristics, a magnetic tape having a magnetic recording layer which consists of two or more layers has been proposed. In the conventional magnetic tape having two or more recording layers, an upper recording layer is made to have a higher coercive force than that of a lower recording layer so as to give excellent characteristics in the high-frequency band to the upper recording layer, and thereby to obtain a high output level in all frequency bands in the resulting medium. However, such conventional tape does not have a uniform reproduction output in all frequency bands because of the distinct separation between the upper and lower recording layers, and for example, the reproduction output of the tape lowers in the mid frequency band or partially decreases in the extreme in the reproduction procedure. Further, the conventional magnetic tape having plural recording layers is disadvantageous from the viewpoint of practical operation and cost for the preparation (for example, a number of coating procedures are required for the tape), although the frequency characteristics are enhanced in accordance with the number of recording layers.

In other conventional magnetic recording medium having plural recording layers, magnetic particles having a short length in the longitudinal direction are incorporated into the upper recording layer for the purpose of reducing a noise level and magnetic particles having a long length in the longitudinal direction are incorporated into in the lower recording layer for the purpose of increasing frequency characteristics in the high-frequency band, in addition to the above-mentioned consideration on the coercive force. However, when the magnetic particles having a long length in the longitudinal direction is used for the lower recording layer, the surface smoothness of the resulting lower recording layer is decreased more than the case of using magnetic particles having a short length in the longitudinal direction. Thus decreased surface condition of the lower recording layer influences on the upper recording layer, and as a result, satisfactory smoothness is hardly given to the surface of the upper recording layer. Accordingly, although the above-mentioned method (i.e., method of using magnetic particles of the specific length in the longitudinal direction in each of the upper and lower recording layers) can improve the frequency characteristics of the resulting medium to a certain level, the frequency characteristics deteriorate in the high-frequency band in the case of an audio tape, and the S/N ratio decreases because of lowering of sensitivity and increase of noises in the case of a video tape.

SUMMARY OF THE INVENTION

It is an object of the present invention to provide a magnetic recording medium such as a magnetic tape which is improved in reproduction output in all frequency bands and a process for the preparation of said magnetic recording medium.

More particularly, the object of the invention is to provide a magnetic recording medium such as a magnetic tape which has a low noise level and a high sensitivity as well as the improved reproduction output in all frequency bands and a process for the preparation of said magnetic recording medium.

There is provided by the present invention a magnetic recording medium comprising a nonmagnetic support, a first magnetic recording layer and a second magnetic recording layer, superposed in order, wherein:

a coercive force of the second magnetic recording layer ($Hc_2$) is in the range of 400 to 2,000 Oe, a ratio of said coercive force ($Hc_2$) to a coercive force of the first magnetic recording layer ($Hc_1$), namely $Hc_2/Hc_1$, being in the range of 1.0 to 2.5;

a mean longitudinal length of a magnetic powder contained in the second magnetic recording layer is not longer than 0.35 μm, a ratio of said mean longitudinal length ($S_2$) to a mean longitudinal length of a magnetic powder contained in the first magnetic recording layer ($S_1$), namely $S_2/S_1$, being in the range of 0.4 to 1.0;

and a mixed area of compositions of the first magnetic recording layer and the second magnetic recording layer which has a thickness of 0.1 to 1.1 μm is provided between the first and second magnetic recording layers.

The magnetic recording medium can be advantageously prepared by the process of the invention comprising the steps of:

coating a magnetic paint for the formation of a first magnetic recording layer over a surface of a nonmagnetic support under running or travelling of the support to give a coated layer of the magnetic paint;

coating a magnetic paint for the formation of a second magnetic recording layer containing a magnetic powder which has a coercive force of 400 to 2,000 Oe, said coercive force being 1.0–2.5 times of coercive force of a magnetic powder contained in the first magnetic recording layer, and a mean longitudinal length of not longer than 0.35 μm, said mean longitudinal length being 0.4–1.0 times of a mean longitudinal length of a magnetic powder contained in the first magnetic recording layer, over the coated layer while the coated layer is wet; and providing a mixed area of compositions of the first magnetic recording layer and the second magnetic recording layer which has a thickness of 0.1 to 1.1 μm between the first and second magnetic recording layers by placing any one of poles of a bar magnet in close vicinity of a surface of the running support so as to inverting magnetic particles contained in each of the first and second magnetic recording layer or by applying a shearing force in the coating procedure of the magnetic paint for the formation of the second magnetic recording layer while the second magnetic recording layer is wet.

The expression "a magnetic recording layer is wet" means that the magnetic recording layer contains a solvent, and particularly means that the magnetic recording layer is dried to such a degree that particles of the magnetic powder can be easily inverted in the magnetic recording layer when a bar magnet is placed in vicinity of the recording layer.

In the magnetic recording medium of the present invention, a first magnetic recording layer (lower magnetic recording layer) and a second magnetic recording layer (upper magnetic recording layer), each layer being specified in its properties such as a coercive force and a mean longitudinal length of magnetic powder particles contained therein, are superposed on the nonmagnetic support, and a mixed area of compositions of the first and second magnetic recording layers having a thickness of 0.1 to 1.1 μm is provided between the two magnetic recording layers. The mixed area can be formed by the above-mentioned process of the invention between the first and second recording layers. Observation of the mixed area with an electron microscope shows that the composition of the mixed area gradually varies from the composition of the lower recording layer to that of the upper recording layer in the upward direction, and therefore it is thought that the coercive force (Hc) in the mixed area continuously varies in accordance with the composition variation. The continuous variation of the coercive force makes it possible for the resulting medium to have a reproduction output of uniformly high level in all frequency bands.

Further, the provision of the mixed area also contributes to lowering of a noise level and enhancement of a sensitivity of the resulting medium.

DETAILED DESCRIPTION OF THE INVENTION

The magnetic recording medium of the present invention can be prepared, for example, by the following process.

In the first place, a magnetic paint for the formation of a first magnetic recording layer which contains a magnetic powder in a binder solution is coated over a nonmagnetic support, and while the coated layer is wet, a magnetic paint for the formation of a second magnetic recording layer which contains a magnetic powder in a binder solution is applied onto the coated layer for the formation of the first magnetic recording layer, to give a coated layer of the magnetic paint for the formation of a second magnetic recording layer.

In the second place, while the coated layer of the magnetic paint for the second magnetic recording layer is wet, the surface of the nonmagnetic support is placed in close vicinity of an orientation magnet to invert particles of the magnetic powder contained in each of the magnetic recording layers, whereby a mixed area of compositions of the first and second magnetic recording layers is provided between the two magnetic recording layers. Otherwise, the mixed area is provided between the two recording layers by utilizing a shearing force occurring in the coating procedure of the magnetic paint for the formation of a second magnetic recording layer, or decreasing a viscosity of each magnetic paint for the first and second magnetic recording layers and thereby bringing about a convection in the drying procedure of the coated layers of the two magnetic paints.

The thickness of the mixed area provided between the first and second magnetic recording layers is required to be in the range of 0.1 to 1.1 μm. When the thickness of the mixed area is smaller than 0.1 μm, the continuous variation of the coercive force in the depth direction becomes too small, and as a result, there arises deterioration of frequency characteristics such as lowering of reproduction output or large fluctuation of output level. When the thickness thereof exceeds 1.1 μm, the output in the specific frequency band which depends on the lower magnetic recording layer cannot be sufficiently given to the resulting medium.

The coercive force of the second magnetic recording layer ($Hc_2$) is required to be in the range of 400 to 2,000 Oe, and a ratio of said coercive force ($Hc_2$) to a coercive force of the first magnetic recording layer ($Hc_1$), namely $Hc_2/Hc_1$, is required to be in the range of 1.0 to 2.5. When $Hc_2/Hc_1$ is less than 1.0, a high output can be hardly obtained in the wide frequency band. When $Hc_2/Hc_1$ exceeds 2.5, the frequency characteristics markedly deteriorate (i.e., output level strikingly lowers) in the mid frequency band because the difference of the recording current running on a magnetic head is too large. Further, when the coercive force of the second magnetic recording layer (upper recording layer) is less than 400 Oe, an output of the high-frequency band can be hardly obtained. When the coercive force thereof exceeds 2,000 Oe, the recorded signal cannot be sufficiently erased using a conventional head.

The mean longitudinal length of the magnetic particles contained in the second magnetic recording layer ($S_2$) is required to be not longer than 0.35 μm, and a ratio of said mean longitudinal length ($S_2$) to a mean longitudinal length of the magnetic particles contained in the first magnetic recording layer ($S_1$), namely $S_2/S_1$, is required to be in the range of 0.4 to 1.0. When $S_2/S_1$ exceeds 1.0, relatively large particles of the magnetic powder exist in the vicinity of a magnetic head to cause occurrence of noises and deterioration of surface smoothness of the resulting medium. When $S_2/S_1$ is less than 0.4, relatively large particles of the magnetic powder exist in the first magnetic recording layer, resulting in occurrence of noises. The mean longitudinal length of the magnetic particles ($S_2$) employable for the second magnetic recording layer (upper recording layer) is required not longer than 0.35 μm as described above, and preferably not longer than 0.30 μm. When the mean longitudinal length thereof exceeds 0.35 μm, the resulting recording medium suffers large noises and deteriorates in the surface smoothness.

As methods of providing the above-described mixed area, there can be mentioned the following four methods.

(1) A magnetic paint for the formation of a first magnetic recording layer (lower magnetic recording layer) is coated over the nonmagnetic support under running of the support. While the coated layer is wet, a magnetic paint for the formation of a second magnetic recording layer (upper magnetic recording layer) is coated thereon. While both of the coated layers are wet, a magnetic orientation for the magnetic particles contained in those layers is performed by the use a cobalt bar magnet (first magnetic orientation). The bar magnet used for the magnetic orientation is preferably arranged vertically against the surface of the nonmagnetic support in such a manner that one pole of the bar magnet is placed in close vicinity of the surface of the support not facing the magnetic recording layer. Accordingly, when N pole of the bar magnet is in vicinity of the surface of the support, S pole of the magnetic particle is drawn toward the magnet and the magnetic particle is inverted in accordance with the running support. Utilizing the inversion of the magnetic particle, the mixed area can be provided between the first and second magnetic recording layers.

(2) A magnetic paint for the formation of a first magnetic recording layer (lower magnetic recording layer) is coated over the nonmagnetic support under running of the support. While the coated layer is wet, a magnetic paint for the formation of a second magnetic recording layer (upper magnetic recording layer) is coated thereon. While both of the coated layers are wet, a magnetic orientation is carried out by the use two or more bar magnets to perform at least two times of inversions of the magnetic particles contained in the coated layers (the same inversion as described in the method (1)). Thus, the mixed area can be provided between the first and second magnetic recording layers. In this method, the plural bar magnets are arranged at regular intervals (preferably an interval of 5 to 15 cm) in the running direction of the support in such a manner that the poles of the magnets are placed in close vicinity of the surface of the support not facing the magnetic recording layer. The bar magnets may be arranged in such a manner that the adjoining poles of the bar magnets are the same as each other or different from each other. From the viewpoint of effective inversion of the magnetic particles, the adjoining poles of the magnets are preferably different from each other.

(3) A magnetic paint for the formation of a first magnetic recording layer (lower magnetic recording layer) is coated over the nonmagnetic support. While the coated layer is wet, a magnetic paint for the formation of a second magnetic recording layer (upper magnetic recording layer) is coated thereon. In the coating procedure of the magnetic paint for the formation of a second magnetic recording layer, a shearing force is applied to the interface between the coated layers of the magnetic paints for the first and second magnetic recording layers. Utilizing the shearing force, the mixed area can be provided between the first and second magnetic recording layers.

For effectively applying the shearing force, there can be employed a method of using a doctor blade in a coating apparatus under the specific conditions. For example, a doctor blade having a wide coating surface is used to take a long period of time for shearing, or a doctor blade provided with a depressed portion on its coating surface is used to vary the shearing force. Otherwise, a doctor blade is used with applying ultrasonic vibration to the blade in the coating procedure to vary the shearing force.

In the case that the difference between the viscosity of the magnetic paint for the lower recording layer and that of the magnetic paint for the upper recording layer is not more than approx. 50 P(Poise) and the viscosity of the magnetic paint for the upper recording layer is higher than that of the magnetic paint for the lower recording layer, the thickness of the resulting mixed area can be made larger, because the shearing force becomes greater as the viscosity of the magnetic paint for the upper recording layer increases. Accordingly, the thickness of the mixed area can be optionally determined to a certain level by combining any one of the above-described methods (1) and (2), both utilizing a bar magnet, and the method of utilizing a shearing force given by a magnetic paint having a high viscosity.

(4) A magnetic paint for the formation of a first magnetic recording layer (lower magnetic recording layer) is coated over the nonmagnetic support. While the coated layer is wet, a magnetic paint for the formation of a second magnetic recording layer (upper magnetic recording layer) is coated thereon, and then both of the coated layers are dried. In the drying procedure, a convection phenomenon takes place in the coated layers. Utilizing the convection phenomenon, the mixed area can be provided between the first and second magnetic recording layers. In this method, each of the magnetic paints for the upper and lower recording layers is required to have a viscosity of not more than 20 P.

After providing the mixed area between the first and second recording layers by the above-described methods, the magnetic recording layer comprising the first and second recording layers is subjected to a magnetic orientation by passing it through an electromagnet (solenoid). Thereafter, the nonmagnetic support having the magnetic recording layer thereon is subjected to various treatments which are conventionally used for the preparation of magnetic recording media, to prepare a magnetic recording medium of the present invention.

Examples of materials of the nonmagnetic support employable in the invention include films or sheets made of synthetic resins such as polyester resins (e.g., polyethylene terephthalate (PET) and polyethylene naphthalate), polyolefin resins (e.g., polypropylene), cellulose derivatives (e.g., cellulose triacetate and cellulose diacetate), vinyl resins (e.g., polyvinyl chloride and polyvinylidene chloride), polycarbonate resins, polyamide resins, polyimide resins and polyamideimide resins; nonmagnetic metal foils such as aluminum foil and copper foil; metal foils such as stainless foil; papers; and ceramic sheets.

The magnetic recording layer of the magnetic recording medium according to the invention comprises a binder and a magnetic powder dispersed therein. There is no specific limitation on the magnetic powder employable in the invention. Examples of the magnetic powder include $\gamma$-$Fe_2O_3$, Co-containing $\gamma$-$Fe_2O_3$, $Fe_3O_4$, Co-containing $Fe_3O_4$, $CrO_2$, Co-Ni-P, Fe-Co-Ni.

A binder solution emplyable for preparing the magnetic paint of the magnetic recording layer according to the invention contains a resin component, a solvent and, if necessary, other additives such as a lubricant and an abrasive.

As the resin component employable in the invention, there can be mentioned thermoplastic resins, thermosetting resins, reaction curing resins and mixtures thereof which are conventionally used for the preparation of magnetic recording media. Examples of the resin components include vinyl chloride copolymers such as a vinyl chloride/vinyl acetate copolymer, a vinyl chloride/vinyl acetate/vinyl alcohol copolymer, a vinyl chloride/vinyl acetate/acrylic acid copolymer, a vinyl chloride/vinylidene chloride copolymer, a vinyl chloride/acrylonitrile copolymer, an ethylene/vinyl acetate copolymer and a vinyl chloride copolymer introduced with a polar group (e.g., —$SO_3Na$ or —$SO_2Na$) and an epoxy group; cellulose derivatives such as nitrocellulose resins; acrylic resins; polyvinyl acetal resins; polyvinyl butyral resins; epoxy resins; phenoxy resins; and polyurethane resins such as a polyester polyurethane resin, a polyurethane resin introduced with a polar group (e.g., —$SO_3Na$ or —$SO_2Na$) and a polycarbonate polyurethane resin.

In the case of using a curing agent for curing the above-mentioned resin, a polyisocyanate compound is generally employed as the curing agent. The polyisocyanate compound can be selected from those generally used for curing polyurethane resin, etc.

In the case of performing a curing treatment by means of electron rays of curing the above-mentioned resin, a compound having a reactive double bond (e.g., urethane acrylate) can be employed in the invention.

Examples of the solvents employable for preparing the magnetic paint include ketones such as acetone, methyl ethyl ketone, methyl isobutyl ketone, ethyl isobutyl ketone and cyclohexanone; esters such as methyl acetate, ethyl acetate, butyl acetate, glycol acetate monoethyl ether; glycol ethers such as ether, glycol dimethylether and dioxane; aromatic hydrocarbons such as benzene, toluene and xylene; chlorinated hydrocarbons such as methylene chloride, ethylene chloride, carbon tetrachloride, chloroform, ethylenechlorohydrin and dichlorobenzene. Preferred are polar solvents such as ketones or solvents containing a polar solvent. These solvents can be employed independently or in combination.

In the preparation of a magnetic paint, the above-mentioned magnetic powder is homogeneously kneaded and dispersed in the binder solution. In this procedure, the magnetic powder is generally pre-dispersed in the binder solution using a two-roll mill, a three-roll mill, an open kneader, a pressure kneader or a continuous kneader and then again dispersed therein using a sand grinder or a ball mill.

The magnetic paint may be optionally incorporated with a variety of additives such as an abrasive, a lubricant, a dispersing agent and an antistatic agent according to the conventional manner depending on the purpose.

The coating of the magnetic paint can be carried out by the conventional coating methods such as an air doctor coating, a blade coating, a rod coating, an extrusion coating, an air knife coating, a squeeze coating, an impregnation coating, a reverse roll coating, a transfer roll coating, a gravure coating, a kiss coating, a cast coating, a spray coating and a spin coating. Details of those coating methods are concretely described in "Coating Technology", pp 253–277, published by Asakura Shoten, Mar. 20, 1971.

The process for the preparation of a magnetic recording medium of the present invention is described above with respect to a magnetic recording medium having a magnetic recording layer which consists of two layers of an upper and lower layers. However, any other magnetic recording medium having a magnetic recording layer consisting of three or more layers can be also applied to the present invention, provided that the magnetic recording layer comprises at least two layers specified in the aforementioned characteristics.

The examples and the comparison examples of the present invention are given below. In the following examples, the term "part(s)" means "part(s) by weight", unless otherwise specified.

The examples and the comparison examples of the preparation of an audio cassette tape are first described hereinafter.

EXAMPLE 1

Composition of Magnetic Paint A for the formation of First Magnetic Recording Layer

| | |
|---|---|
| Co-containing $FeO_x$ (x = 1.45, Hc: 580 Oe, mean longitudinal length: 0.32 $\mu$m, specific surface area: 30 $m^2/g$) | 100 parts |
| Vinyl chloride/vinyl acetate copolymer (Denka Vinyl 1000 G, available from DENKI KAGAKU KOGYO K. K.) | 12 parts |
| Polyurethane resin (Crysbon 7209, available from Dainippon Ink & Chemicals, Inc.) | 6 parts |
| Oleic acid | 0.5 part |
| Myristic acid | 2 parts |
| Dimethyl polysiloxane (polymerization degree: 60) | 0.5 part |
| Polyisocyanate (Colonate L-75, available from Japan Polyurethane Co., Ltd.) | 6 parts |
| Butyl acetate | 90 parts |
| Methyl ethyl ketone | 70 parts |
| Cyclohexanone | 20 parts |

Composition of Magnetic Paint B for the formation of Second Magnetic Recording Layer

| | |
|---|---|
| Co-containing $FeO_x$ (x = 1.45, Hc: 830 Oe, mean longitudinal length: 0.25 $\mu$m, specific surface area: 42 $m^2/g$) | 100 parts |
| Vinyl chloride/vinyl acetate copolymer (Denka Vinyl 1000 G, available from DENKI KAGAKU KOGYO K. K.) | 12 parts |
| Polyurethane resin (Crysbon 7209, available from Dainippon Ink & Chemicals Inc.) | 6 parts |
| Carbon black | 0.5 part |
| $\alpha$-$Al_2O_3$ | 0.5 part |
| Oleic acid | 0.5 part |
| Myristic acid | 2 parts |
| Dimethyl polysiloxane (polymerization degree: 60) | 0.5 part |
| Polyisocyanate (Colonate L-75, available | 6 parts |

-continued

| | |
|---|---|
| from Japan Polyurethane Co., Ltd.) | |
| Butyl acetate | 110 parts |
| Methyl ethyl ketone | 95 parts |
| Cyclohexanone | 20 parts |

With respect to each of the above-mentioned two compositions, the components excluding polyisocyanate were kneaded in a ball mill for 48 hours to give a mixture. To the mixture was added polyisocyanate and they were kneaded in the ball mill for 20 minutes to give a dispersion. Each of the dispersions was filtered over a filter having a mean pore size of 1 μm to prepare two kinds of magnetic paints, namely, a magnetic paint A for the formation of a first magnetic recording layer and a magnetic paint B for the formation of a second magnetic recording layer.

The obtained magnetic paint A was coated over a surface of a polyethylene terephthalate support (thickness: 12 μm) under running the support at a speed of 60 m/min. by means of a reverse roll in such a manner that the coated layer would have thickness of 4 μm in dry basis. While the coated layer of the magnetic paint A was wet, the magnetic paint B was coated thereon in such a manner that the coated layer of the magnetic paint B would have thickness of 1.2 μm in dry basis by means of a reverse roll. While both of the coated layers of the magnetic paints A and B were wet, the support having the coated layers thereon was passed on a magnet under the following conditions (a) to provide a mixed area of the two compositions of the magnetic paints A and B between the coated layer of the magnetic paint A and the coated layer of the magnetic paint B.

Conditions (a)

One cobalt bar magnet (3,000 gauss) is arranged on a surface of the support not facing the magnetic recording layer in such a manner that the bar magnet is vertical against the surface of the support and N pole of the bar magnet is in close vicinity of the surface of the support.

After the mixed area was provided as above, the support with the coated layers was subjected to a magnetic orientation by means of a direct current type electromagnet, and then subjected to drying.

After drying, the resulting sheet was subjected to a supercalendering treatment, and then split to give an audio cassette tape having a width of 3.8 mm.

The viscosity of each magnetic paint used in Example 1 and the following Examples are set forth in Table 1.

TABLE 1

| Magnetic Paint | Viscosity (poise, at 25° C.) |
|---|---|
| Magnetic paint A for the formation of first magnetic recording layer | 65 |
| Magnetic paint A1 for the formation of first magnetic recording layer | 25 |
| Magnetic paint B for the formation of second magnetic recording layer | 30 |
| Magnetic paint B1 for the formation of second magnetic recording layer | 72 |

Each viscosity set forth in Table 1 is a value measured by a tubular rotating viscometer (VS-H1 type, produced by Shibaura System Co., Ltd.).

EXAMPLE 2

The procedure of Example 1 was repeated except for replacing the conditions (a) with the following conditions (b) for providing a mixed area of the compositions of the magnetic paints A and B, to prepare an audio cassette tape.

Conditions (b)

Three cobalt bar magnets (each magnet: 3,000 gauss) are arranged on a surface of the support not facing the magnetic recording layer at intervals of 10 cm in such a manner that all bar magnets are vertical against the surface of the support, a pole of each magnet is in close vicinity of the surface of the support, and adjoining poles of the bar magnets are different from each other with respect to the polarity.

EXAMPLE 3

The procedure of Example 1 was repeated except for using a magnetic paint B1 having the viscosity set forth in Table 1 instead of the magnetic paint B, to prepare an audio cassette tape.

The magnetic paint B1 has the same composition as that of the magnetic paint B except for varying the amounts of methyl ethyl ketone and butyl acetate to 70 parts and 90 parts, respectively.

EXAMPLE 4

The procedure of Example 3 was repeated except for using a magnetic paint A1 having the viscosity set forth in Table 1 instead of the magnetic paint A, to prepare an audio cassette tape.

The magnetic paint A1 has the same composition as that of the magnetic paint A except for varying the amounts of methyl ethyl ketone and butyl acetate to 95 parts and 105 parts, respectively.

COMPARISON EXAMPLE 1

The magnetic paint A for the formation of a first magnetic recording layer was coated over a surface of a polyethylene terephthalate support (thickness: 12 μm) under running the support at 60 m/min. by means of a reverse roll to give a coated layer having thickness of 4 μm in dry basis. The support having the coated layer thereon was successively subjected to a magnetic orientation, a drying procedure and a supercalendering treatment, and then allowed to stand in a drying room at 70° C. for 24 hours to heat-cure the first magnetic recording layer.

Subsequently, over the first magnetic recording layer was coated a magnetic paint B for the formation of a second magnetic recording layer by means of a reverse roll to give a coated layer of the magnetic paint B having thickness of 1.2 μm in dry basis. The resulting sheet was successively subjected to a magnetic orientation, a drying procedure and a supercalendering treatment. The sheet was then split to give an audio cassette tape having a width of 3.8 mm.

COMPARISON EXAMPLE 2

The procedure of Example 1 was repeated except for not providing a mixed area of the compositions of the magnetic paints A and B, to prepare an audio cassette tape.

COMPARISON EXAMPLE 3

The procedure of Example 4 was repeated except for replacing the conditions (a) with the conditions (b) for providing a mixed area of the compositions of the magnetic paints A and B, to prepare an audio cassette tape.

The audio cassette tapes obtained in the above-described examples were examined on the following various properties in the following manner.

Thickness of each magnetic recording layer and mixed area (a) A curable resin was coated around the cassette tape and the resin was cured. Thus treated tape was cut vertically against the longitudinal direction by means of a diamond cutter to give an extremely thin strip. The cut surface of the thin strip was photographed by means of a transmission type-electron microscope.

(b) The cut surface of the magnetic recording layer was photographed by means of a scanning electron microscope of field emission type in the same manner as described above.

From the two electron micrographs obtained in the above methods (a) and (b), the locations of the upper and lower magnetic recording layers and the mixed area were determined, and each thickness of the magnetic recording layers and the mixed area was measured.

Frequency properties

Signals of various frequencies (315 Hz, 500 Hz, 1 kHz, 2 kHz, 3 kHz, 5 kHz and 10 kHz) were recorded at −20 dB on each tape, and the recorded signals were reproduced to measure reproduction output of each frequency. The output level was expressed by a relative value based on the output level of 315 Hz being 0 dB.

Sensitivity (315 Hz)

The sensitivity of each tape was measured by means of a commercial tape deck (582 type of Nakamichi Co., Ltd.). The sensitivity was expressed by a relative value based on a sensitivity of a commercial tape (FR-II of Fjui Photo Film Co., Ltd.) at high-position being 0 dB.

Output fluctuation

A signal of 10 kHz was recorded simultaneously on each tape at −20 dB for 3 minutes, and the output of the recorded signal was measured. The measurement was done at three positions for each tape to determine the output fluctuation of the tape.

The thickness of each magnetic recording layer and the mixed area, the coercive force of each magnetic recording layer and the mean longitudinal length of magnetic particles contained therein with respect to the magnetic recording media obtained in Examples 1 to 4 and Comparison Examples 1 to 3 are set forth in Table 2, in which each of $Hc_2$, $Hc_1$, $S_2$ and $S_1$ means a coercive force of the second magnetic recording layer, a coercive force of the first magnetic recording layer, a mean longitudinal length of magnetic particles contained in the second magnetic recording layer, and a mean longitudinal length of magnetic particles contained in the first magnetic recording layer, respectively.

The results of the above-mentioned examinations on various properties with respect to Examples 1 to 4 and Comparison Examples 1 to 3 are set forth in Table 3.

TABLE 2

|  | Example | | | | Com. Example | | |
|---|---|---|---|---|---|---|---|
|  | 1 | 2 | 3 | 4 | 1 | 2 | 3 |
| Thickness (μm) | | | | | | | |
| second layer | 1.1 | 1.1 | 0.9 | 0.7 | 1.2 | 1.2 | 0.6 |
| first layer | 3.9 | 3.8 | 3.8 | 3.5 | 4.1 | 4.0 | 3.4 |
| mixed area | 0.1 | 0.3 | 0.6 | 1.0 | 0.1> | 0.1> | 1.2 |
| Coercive force | | | | | | | |
| $Hc_2$ (Oe) | 842 | 842 | 842 | 842 | 842 | 842 | 842 |
| $Hc_1$ (Oe) | 590 | 590 | 590 | 590 | 590 | 590 | 590 |
| $Hc_2/Hc_1$ | 1.4 | 1.4 | 1.4 | 1.4 | 1.4 | 1.4 | 1.4 |

TABLE 2-continued

|  | Example | | | | Com. Example | | |
|---|---|---|---|---|---|---|---|
|  | 1 | 2 | 3 | 4 | 1 | 2 | 3 |
| Mean longitudinal length | | | | | | | |
| $S_2$ (μm) | 0.25 | 0.25 | 0.25 | 0.25 | 0.25 | 0.25 | 0.25 |
| $S_1$ (μm) | 0.32 | 0.32 | 0.32 | 0.32 | 0.32 | 0.32 | 0.32 |
| $S_2/S_1$ | 0.8 | 0.8 | 0.8 | 0.8 | 0.8 | 0.8 | 0.8 |

TABLE 3

|  | Example | | | | Com. Example | | |
|---|---|---|---|---|---|---|---|
|  | 1 | 2 | 3 | 4 | 1 | 2 | 3 |
| Frequency properties (dB) | | | | | | | |
| 500 Hz | 0.0 | 0.0 | 0.0 | 0.0 | −0.2 | −0.3 | 0.0 |
| 1 kHz | −0.2 | 0.0 | 0.0 | 0.0 | −0.5 | −0.5 | 0.0 |
| 2 kHz | −0.4 | −0.2 | 0.0 | 0.0 | −1.0 | −1.0 | 0.0 |
| 3 kHz | −0.2 | 0.0 | +0.1 | +0.3 | −0.6 | −0.7 | +0.1 |
| 5 kHz | 0.0 | +0.3 | +0.4 | +0.3 | −0.3 | −0.3 | +0.3 |
| 10 kHz | +0.7 | +0.7 | +0.8 | +0.8 | +0.7 | +0.7 | +0.7 |
| Sensitivity (dB) | | | | | | | |
| (315 Hz) | +0.6 | +0.4 | +0.4 | +0.2 | +0.6 | +0.6 | −0.3 |
| Output fluctuation | | | | | | | |
| (10 kHz) | 0.6 | 0.4 | 0.3 | 0.3 | 0.4 | 0.9 | 0.2 |

From the results set forth in Tables 2 and 3, it was confirmed that the audio tapes of Examples 1 to 4, each having a mixed are of the compositions of the first and second magnetic recording layers, hardly showed lowering of output level in all frequency bands and had high sensitivity.

On the contrary, the audio tapes of Comparison Examples 1 and 2, each having no mixed area, showed lowering of output level in the mid frequency band, namely 1 to 3 kHz. The audio tape of Comparison Example 3 having a mixed area of large thickness was decreased in the sensitivity, and accordingly it was confirmed that an audio tape having a mixed area of large thickness is unfavorable.

Figure 1:
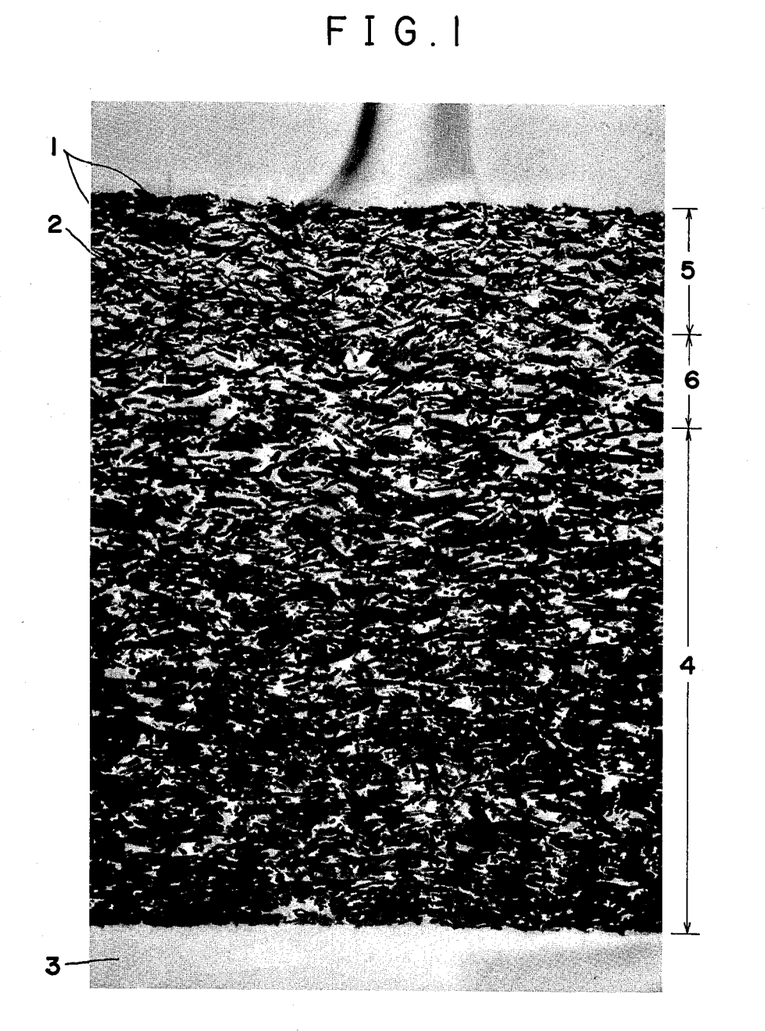
FIG. 1 is a photo which shows sectional schematic view obtained by photographing a section of a magnetic recording layer prepared in Example 3 by means of a scanning type electron microscope.
Figure 2:
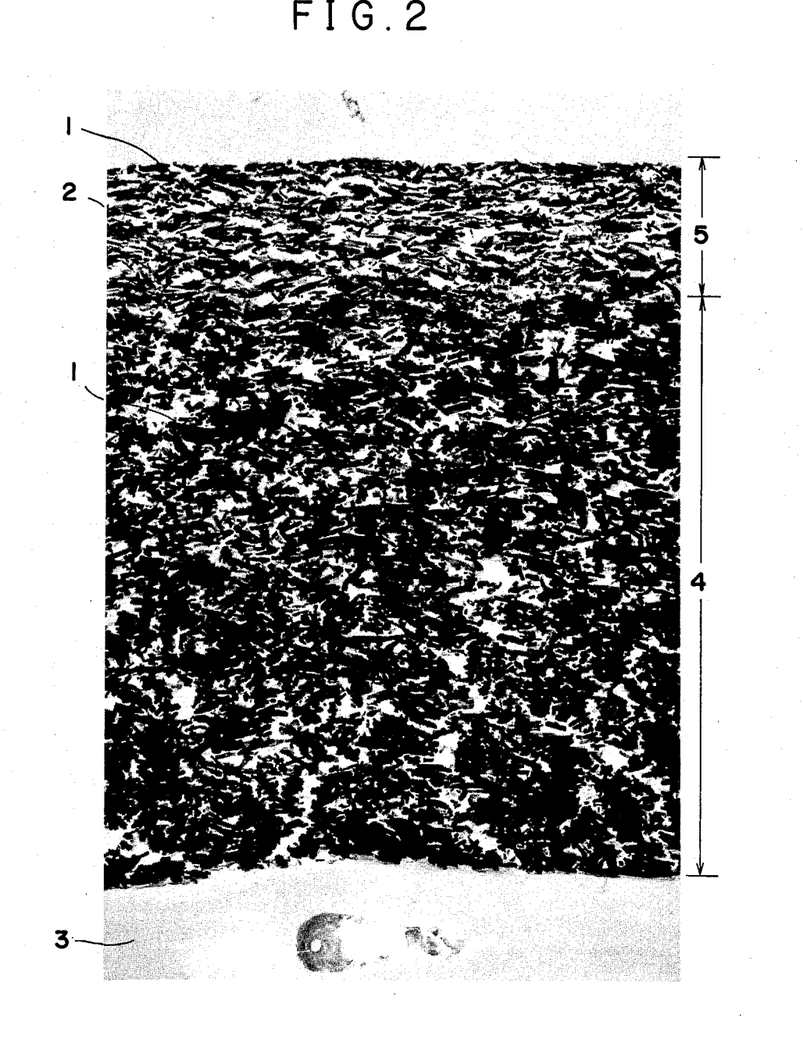
FIG. 2 is a photo which shows sectional schematic view obtained by photographing a section of a magnetic recording layer prepared in Comparison Example 1 by means of a scanning type electron microscope.

Photos of the sectional electron micrographs of the magnetic recording layers of the audio tapes prepared in Example 3 and Comparison Example 1, that is, electron micrographs obtained in the aforementioned methods (a) and (b), are attached here (FIG. 1 and FIG. 2, respectively). In FIGS. 1 and 2, the audio tape comprises a ferromagnetic powder 1, a binder 2, a nonmagnetic support 3, a first magnetic recording layer 4 and a second magnetic recording layer 5. In FIG. 1, the audio tape further comprises a mixed area 6. As shown in FIG. 1 according to Example 3, an area containing the compositions of the first and second magnetic recording layers in the mixed form (i.e., mixed area 6) was observed, but such area was not observed in FIG. 2 according to Comparison Example 1.

The examples and the comparison examples of the preparation of a video cassette are described hereinafter.

EXAMPLE 5

Composition of Magnetic Paint C for the formation of First Magnetic Recording Layer

| | |
|---|---|
| Co-containing $FeO_x$ (x = 1.45, Hc: 650 Oe, mean longitudinal length: 0.32 μm, specific surface area: 30 m²/g) | 100 parts |
| Vinyl chloride/vinyl acetate/maleic anhydride copolymer (copolymerization ratio = 87:8:5, polymerization degree: 400) | 12 parts |
| Polyurethane resin (Crysbon 7209, available from Dainippon Ink & Chemicals Inc.) | 6 parts |

-continued

| | |
|---|---|
| Stearic acid | 3 parts |
| Butyl stearate | 1 part |
| Polyisocyanate (Colonate L-75, available from Japan Polyurethane Co., Ltd.) | 6 parts |
| Butyl acetate | 90 parts |
| Methyl ethyl ketone | 70 parts |
| Cyclohexanone | 20 parts |

Composition of Magnetic Paint D for the formation of Second Magnetic Recording Layer

| | |
|---|---|
| Co-containing $FeO_x$ ($x$ = 1.45, Hc: 900 Oe, mean longitudinal length: 0.25 μm, specific surface area: 42 m²/g) | 100 parts |
| Vinyl chloride/vinyl acetate/maleic anhydride copolymer (copolymerization ratio = 87:8:5, polymerization degree: 400) | 12 parts |
| Polyurethane resin (Crysbon 7209, available from Dainippon Ink & Chemicals Inc.) | 6 parts |
| Carbon black | 1 part |
| $\alpha$-$Al_2O_3$ | 3 parts |
| Stearic acid | 3 parts |
| Butyl stearate | 1 part |
| Polyisocyanate (Colonate L-75, available from Japan Polyurethane Co., Ltd.) | 6 parts |
| Butyl acetate | 105 parts |
| Methyl ethyl ketone | 95 parts |
| Cyclohexanone | 20 parts |

With respect to Each of the above-described two compositions, the components excluding polyisocyanate were kneaded in a ball mill for 48 hours to give a mixture. To the mixture was added polyisocyanate and they were kneaded for 20 minutes in the ball mill to give a dispersion. Each of the dispersions was filtrated over a filter having a mean pore size of 1 μm to prepare two kinds of magnetic paints, namely, a magnetic paint C for the formation of a first magnetic recording layer and a magnetic paint D for the formation of a second magnetic recording layer.

The obtained magnetic paint C was coated over a surface of a polyethylene terephthalate support (thickness: 14 μm) under running the support at a speed of 60 m/min. by means of a reverse roll in such a manner that the coated layer would have thickness of 3 μm in dry basis. While the coated layer of the magnetic paint C was wet, the magnetic paint D was coated thereon in such a manner that the coated layer of the magnetic paint D would have thickness of 1.0 μm in dry basis by means of a reverse roll. While both of the coated layers of the magnetic paints C and D were wet, the support having the coated layers thereon was passed on a magnet under the following conditions (a) to provide a mixed area of the two compositions of the magnetic paints.

Conditions (a)

One cobalt bar magnet (3,000 gauss) is arranged on a surface of the support not facing the magnetic recording layer in such a manner that the bar magnet is vertical against the surface of the support and N pole of the bar magnet is in close vicinity of the surface of the support.

After the mixed area was provided as above, the support with the coated layers was subjected to a magnetic orientation by means of a direct current type electromagnet, and the subjected to drying.

After drying, the resulting sheet was subjected to a supercalendering treatment, and then slit to give a video cassette tape having a width of ½ inch.

The visocity of each magnetic paint used in Example 5 and the following Examples are set forth in Table 1.

TABLE 4

| Magnetic Paint | Viscosity (poise, at 25° C.) |
|---|---|
| Magnetic paint C for the formation of first magnetic recording layer | 80 |
| Magnetic paint C1 for the formation of first magnetic recording layer | 37 |
| Magnetic paint D for the formation of second magnetic recording layer | 43 |
| Magnetic paint D1 for the formation of second magnetic recording layer | 90 |

Each viscosity set forth in Table 4 is a value measured by a tubular rotating viscometer (VS-H1 type, produced by Shibaura System Co., Ltd.).

EXAMPLE 6

The procedure of Example 5 was repeated except for replacing the conditions (a) with the following conditions (b) for providing a mixed area of the compositions of the magnetic paints C and D, to prepare a video cassette tape.

Conditions (b)

Three cobalt bar magnets (each magnet: 3,000 gauss) are arranged on a surface of the support not facing the magnetic recording layer at intervals of 10 cm in such a manner that all bar magnets are vertical against the surface of the support, a pole of each magnet is in close vicinity of the surface of the support, and adjoining poles of the bar magnets are different from each other in the polarity.

EXAMPLE 7

The procedure of Example 5 was repeated except for using a magnetic paint D1 having the viscosity set forth in Table 4 instead of the magnetic paint D, to prepare a video cassette tape.

The magnetic paint D1 has the same composition as that of the magnetic paint D except for varying the amounts of methyl ethyl ketone and butyl acetate to 70 parts and 90 parts, respectively.

EXAMPLE 8

The procedure of Example 7 was repeated except for using a magnetic paint C1 having the viscosity set forth in Table 4 instead of the magnetic paint C, to prepare a video cassette tape.

The magnetic paint C1 has the same composition as that of the magnetic paint C except for varying the amounts of methyl ethyl ketone and butyl acetate to 95 parts and 105 parts, respectively.

COMPARISON EXAMPLE 4

The magnetic paint C for the formation of a first magnetic recording layer was coated over a surface of a polyethylene terephthalate support (thickness: 14 μm) under running the support at 60 m/min. by means of a reverse roll to give a coated layer having thickness of 3 μm in dry basis. The support having the coated layer thereon was successively subjected to a magnetic orientation, a drying procedure and a supercalendering treatment, and then allowed to stand in a drying room at 70°

C. for 24 hours to heat-cure the first magnetic recording layer.

Subsequently, over the first magnetic recording layer was coated a magnetic paint D for the formation of a second magnetic recording layer by means of a reverse roll to give a coated layer of the magnetic paint D having thickness of 1.0 μm in dry basis. The resulting sheet was successively subjected to a magnetic orientation, a drying procedure and a supercalendering treatment. The sheet was then slit to give a video cassette tape having a width of ½ inch.

COMPARISON EXAMPLE 5

The procedure of Example 5 was repeated except for not providing a mixed area of the compositions of the magnetic paints C and D, to prepare a video cassette tape.

COMPARISON EXAMPLE 6

The procedure of Example 8 was repeated except for replacing the conditions (a) with the conditions (b) for providing a mixed area of the compositions of the magnetic paints C and D, to prepare a video cassette tape.

The video cassette tapes obtained in the above-described examples were examined on the following various properties in the following manner.

Thickness of each magnetic recording layer and mixed area

The thickness of each magnetic recording layer and the mixed area was measured in the same manner as for the aforementioned audio cassette tapes.

Video output and C/N ratio

The video output was expressed by a relative value based on a commercial video cassette tape (Super HG of VHS type, available from Fuji Photo Film Co., Ltd.) being 0 dB.

The C/N ratio was expressed by a ratio of noise at an output of 4 MHz to noise at a frequency distant from 4 MHz by 1 MHz.

Erasure rate

Erasure rate of the video tape was determined by the following formula:

$$e_1 - e_2$$

in which $e_1$ is a value of an output obtained by recording a signal on a tape at a specified recording power and then passing a reproduction output of the recorded signal through a ⅓ octave filter, and $e_2$ is a value of an output obtained by recording a signal on a tape at a specified recording power, erasing the recorded signal at a specified erasing current and then passing the reproduction output through a ⅓ octave filter.

Surface roughness

Surface roughness of the magnetic recording layer of the video tape was determined by measuring a center line average height defined according to JIS B0601, Clause 5. In this case, the cut off value is 0.25 mm.

The thickness of each magnetic recording layer and the mixed area, the coercive force of each magnetic recording layer and the mean longitudinal length of magnetic particles contained therein with respect to the magnetic recording media obtained in Examples 5 to 8 and Comparison Examples 4 to 6 are set forth in Table 5, in which each of $Hc_2$, $Hc_1$, $S_2$ and $S_1$ means a coercive force of the second magnetic recording layer, a coercive force of the first magnetic recording layer, a mean longitudinal length of magnetic particles contained in the second magnetic recording layer, and a mean longitudinal length of magnetic particles contained in the first magnetic recording layer, respectively.

The results of the examinations on various properties with respect to Examples 5 to 8 and Comparison Examples 4 to 6 are set forth in Table 6.

TABLE 5

|  | Example | | | | Com. Example | | |
|---|---|---|---|---|---|---|---|
|  | 5 | 6 | 7 | 8 | 4 | 5 | 6 |
|  | Thickness (μm) | | | | | | |
| second layer | 1.0 | 0.9 | 0.7 | 0.5 | 1.0 | 1.1 | 0.4 |
| first layer | 2.9 | 2.8 | 2.7 | 2.5 | 3.0 | 3.0 | 2.4 |
| mixed area | 0.1 | 0.3 | 0.6 | 1.0 | 0.1> | 0.1> | 1.2 |
|  | Coercive force | | | | | | |
| $Hc_2$ (Oe) | 920 | 920 | 920 | 920 | 920 | 920 | 920 |
| $Hc_1$ (Oe) | 667 | 667 | 667 | 667 | 667 | 667 | 667 |
| $Hc_2/Hc_1$ | 1.4 | 1.4 | 1.4 | 1.4 | 1.4 | 1.4 | 1.4 |
|  | Mean longitudinal length | | | | | | |
| $S_2$ (μm) | 0.25 | 0.25 | 0.25 | 0.25 | 0.25 | 0.25 | 0.25 |
| $S_1$ (μm) | 0.32 | 0.32 | 0.32 | 0.32 | 0.32 | 0.32 | 0.32 |
| $S_2/S_1$ | 0.8 | 0.8 | 0.8 | 0.8 | 0.8 | 0.8 | 0.8 |

TABLE 6

|  | Example | | | | Com. Example | | |
|---|---|---|---|---|---|---|---|
|  | 5 | 6 | 7 | 8 | 4 | 5 | 6 |
|  | Surface roughness | | | | | | |
| (Ra, × 10⁻³ μm) | 6.3 | 5.4 | 5.0 | 4.8 | 8.5 | 7.9 | 4.8 |
|  | Video output | | | | | | |
| 629 kHz | +1.7 | +2.0 | +2.4 | +2.5 | +1.1 | +1.3 | +1.9 |
| 4 MHz | +2.8 | +3.3 | +3.4 | +3.0 | +2.2 | +2.3 | +2.4 |
|  | C/N | | | | | | |
|  | +2.5 | +3.2 | +3.2 | +2.7 | +2.0 | +2.1 | +2.0 |
|  | Erasure rate (dB) | | | | | | |
|  | 69 | 68 | 69 | 67 | 70 | 69 | 68 |

From the results set forth in Tables 5 and 6, it was confirmed that the video tapes of Examples 5 to 8, each having a mixed area of the compositions of the first and second magnetic recording layers, showed a high video output and a high C/N.

The video tapes of Comparison Examples 4 and 5, each having no mixed area, were markedly reduced not only in the video output but also in the C/N as compared with the video tapes of Examples 5 to 8. Further, the video tapes of Comparison Examples 4 and 5, each having a mixed area of large thickness, were decreased in both of the video output and the C/N, and accordingly, it was confirmed that the video output and C/N tend to lower when the thickness of the mixed area of a video tape is made larger.

We claim:

1. A magnetic recording medium comprising a nonmagnetic support, a first magnetic recording layer and a second magnetic recording layer, superposed in order, wherein:

the coercive force of the second magnetic recording layer is in the range of 400 to 2,000 Oe, the ratio of said coercive force to the coercive force of the first magnetic recording layer being in the range of 1.0 to 2.5;

the mean longitudinal length of the magnetic powder contained in the second magnetic recording layer is not longer than 0.35 μm, the ratio of said mean longitudinal length to the mean longitudinal length of the magnetic powder contained in the second magnetic recording layer being in the range of 0.4 to 1.0; and a mixed area of compositions of the first magnetic recording layer and the second magnetic recording layer which has a thickness ranging from 0.1 to 1.1 μm provided between the first and second magnetic recording layers.

2. The magnetic recording medium as claimed in claim 1, wherein the thickness of said mixed area between the first and second magnetic recording layers is in the range of 0.3 to 1.0 μm.

3. The magnetic recording medium as claimed in claim 1, wherein the coercive force of the first magnetic recording layer is in the range of 300 to 1,400 Oe and the mean longitudinal length of the magnetic powder contained in the first magnetic recording layer is not longer than 0.6 μm.

4. The magnetic recording medium as claimed in claim 1, wherein the coercive force of the second magnetic recording layer is in the range of 400 to 1,800 Oe and the ratio of said coercive force to the coercive force of the first magnetic recording layer is in the range of 1.0 to 2.0.

5. The magnetic recording medium as claimed in claim 1, wherein the mean longitudinal length of the magnetic powder contained in the second magnetic recording layer is not longer than 0.3 μm and the ratio of said mean longitudinal length to the mean longitudinal length of the magnetic powder contained in the first magnetic recording layer is in the range of 0.4 to 0.9.

6. A process for the preparation of a magnetic recording medium which comprises the steps of:
    coating a magnetic paint for the formation of a first magnetic recording layer over a surface of a travelling nonmagnetic support to give a coated layer of the magnetic paint;
    coating a magnetic paint for the formation of a second magnetic recording layer containing a magnetic powder which has a coercive force of 400 to 2,000 Oe, said coercive force being 1.0-2.5 times the coercive force of the magnetic powder contained in the first magnetic recording layer, and having a mean longitudinal length of not longer than 0.35 μm, said mean longitudinal length being 0.4-1.0 times of the mean longitudinal length of the magnetic powder contained i the first magnetic recording layer, over the coated layer of the magnetic paint for the formation of a first magnetic recording layer while the coated layer is wet; and
    providing a mixed area of compositions of the first magnetic recording layer and the second magnetic recording layer which has a thickness of 0.1 to 1.1 μm between the first and second magnetic recording layers by placing one pole of a bar magnet in close vicinity to the surface of the travelling support and thereby inverting particles of the magnetic powder contained in each of the first and second magnetic recording layers while both magnetic recording layers are wet.

7. The process as claimed in claim 6, wherein one bar magnet is arranged in the travelling direction of the nonmagnetic support.

8. The process as claimed in claim 6, wherein two or more bar magnets are arranged in the travelling direction of the nonmagnetic support in such a manner that the adjoining poles of the bar magnets are different from each other with respect to the polarity.

9. The process as claimed in claim 6, wherein two or more bar magnets are arranged in the travelling direction of the nonmagnetic support in such a manner that the adjoining poles of the bar magnets are the same as each other with respect to the polarity.

10. A process for the preparation of a magnetic recording medium which comprises the steps of:
    coating a magnetic paint for the formation of a first magnetic recording layer over a surface of a travelling nonmagnetic support to give a coated layer of the magnetic paint; and
    coating a magnetic paint for the formation of a second magnetic recording layer containing a magnetic powder which has a coercive force in the range of 400 to 2,000 Oe, said coercive force being 1.0-2.5 times the coercive force of the magnetic powder contained in the first magnetic recording layer, and having a mean longitudinal length of not longer than 0.35 μm, said mean longitudinal length being 0.4-1.0 times of the mean longitudinal length of the magnetic powder contained in the first magnetic recording layer, over the coated layer of the magnetic paint for the formation of the first magnetic recording layer and applying a shearing force to the coated layer while both coated layers are wet, so as to simultaneously provide a mixed area of compositions of the first magnetic recording layer and the second magnetic recording layer which has a thickness of 0.1 to 1.1 μm between the first and second magnetic recording layers.

11. The process as claimed in claim 10, wherein the shearing force is applied by means of a doctor blade having a depressed portion on its coating surface.

* * * * *